(12) United States Patent
Bova et al.

(10) Patent No.: US 7,644,655 B1
(45) Date of Patent: Jan. 12, 2010

(54) COMMERCIAL TOMATO STRAINER ATTACHMENT

(76) Inventors: Frank Bova, 4 Heather La., Horsham, PA (US) 19044; Tony Colloi, 115 Ridings La., Doylestown, PA (US) 18901

( * ) Notice: Subject to any disclaimer, the term of this patent is extended or adjusted under 35 U.S.C. 154(b) by 558 days.

(21) Appl. No.: 11/437,331

(22) Filed: May 19, 2006

Related U.S. Application Data

(60) Provisional application No. 60/682,264, filed on May 19, 2005.

(51) Int. Cl.
*A23L 1/00* (2006.01)

(52) U.S. Cl. .......................... 99/510; 99/513

(58) Field of Classification Search .......... 99/509–513, 99/467–472, 495, 483, 516, 348, 485; 100/72, 100/145; 141/82, 146; 241/260, 92, 37.5; 198/676; 366/279, 318; 426/387–388, 150; 159/10, 17.3
See application file for complete search history.

(56) References Cited

U.S. PATENT DOCUMENTS

| | | | | |
|---|---|---|---|---|
| 2,513,974 A | * | 7/1950 | Thomas | 100/97 |
| 2,558,799 A | * | 7/1951 | Thomas | 99/510 |
| 2,864,419 A | * | 12/1958 | Woock | 99/513 |
| 3,083,634 A | * | 4/1963 | Rietz | 99/467 |
| 3,138,178 A | * | 6/1964 | McK Martin | 141/82 |
| 3,175,596 A | * | 3/1965 | Raye | 99/470 |
| 3,976,001 A | * | 8/1976 | Trovinger | 99/513 |
| 4,643,085 A | * | 2/1987 | Bertocchi | 99/510 |
| 4,707,372 A | | 11/1987 | Catelli | |
| 4,840,119 A | | 6/1989 | Caldi | |
| 5,651,305 A | * | 7/1997 | Bushman et al. | 99/510 |
| 5,912,038 A | | 6/1999 | Gruenwald | |
| 6,056,987 A | * | 5/2000 | Frenkel et al. | 426/510 |
| 6,517,881 B2 | * | 2/2003 | Elizondo et al. | 426/482 |

* cited by examiner

*Primary Examiner*—Timothy F. Simone

(57) ABSTRACT

A commercial tomato strainer attachment includes a hopper having open top and bottom ends and a downwardly converging wall. The bottom end has a cylindrical shape and a smaller diameter than the top end. A bottom support member is coupled to the hopper bottom end and has a cavity vertically aligned therebeneath. A drive shaft extends through the cavity and has a helical blade traveling along a major length thereof that is partially seated within the bottom support member. The blade radius decreases from a proximal to a distal end thereof. A universal coupling is mounted to the support member exterior surface. The proximal drive shaft end and the coupling are attachable to a commercial mixer. The hollow chamber is coupled to the bottom support member, houses a major length of the blade and the drive shaft, and has a distal end for discharging tomatoes therefrom.

18 Claims, 3 Drawing Sheets

COMMERCIAL TOMATO STRAINER ATTACHMENT

CROSS REFERENCE TO RELATED APPLICATIONS

This application claims the benefit of U.S. Provisional Application No. 60/682,264, filed May 19, 2005.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to strainer attachments and, more particularly, to a commercial tomato strainer attachment that is removably connectable to a commercial mixer for pureeing tomato and like food products.

2. Prior Art

No matter how you slice them, tomatoes have been a popular addition to many dishes from various countries and regions. Now, with health organizations touting their highly impressive cancer preventing powers, the tomato has become an even more important addition to a nutritious diet. Typically eaten freshly sliced on a sandwich or as an addition to sauces and stews, home cooks and professional chefs alike are busy developing recipes featuring the succulent goodness and health benefits of tomatoes.

Tomatoes are a versatile ingredient, especially when lightly processed into a pulp, and free of seeds and skin. Extracting the pulp has never been an easy process, as the seeds are contained in a soft membrane inside the tomato, and the skin is tightly adhered. It would be advantageously to have an apparatus that allows a user to separate the seeds and skins from tomatoes.

Accordingly, a need remains for a commercial tomato strainer attachment in order to overcome the above-noted shortcomings. The present invention satisfies such a need by providing a tomato strainer attachment that is convenient and easy to use, is durable in design, and increases the efficiency with which a commercial food establishment operates. Such a tomato strainer attachment saves the user a considerable amount of time and energy by presenting the user with a reduced number of mechanical problems. The commercial tomato strainer attachment effectively and efficiently separates skins and seeds from tomatoes, thus eliminating the need to do it by hand.

BRIEF SUMMARY OF THE INVENTION

In view of the foregoing background, it is therefore an object of the present invention to provide a commercial tomato strainer attachment. These and other objects, features, and advantages of the invention are provided by a commercial tomato strainer attachment removably connectable to a commercial mixer for puréeing tomato and like food products.

The commercial tomato strainer attachment includes a hopper that has an open top end provided with a downwardly converging outer wall terminating at an open bottom end. Such an open bottom end has a cylindrical shape and is provided with a diameter smaller than a diameter of the open top end such that the tomatoes deposited into the hopper are effectively and conveniently caused to exit out a vertical passageway centrally registered with the open bottom end.

A bottom support member is directly coupled to the open bottom end of the hopper. Such a bottom support member further has a cavity vertically aligned beneath the open bottom end. The cavity effectively directs the tomatoes along a horizontal passageway leading away from the vertical passageway.

An elongated drive shaft has a longitudinal length extending through the cavity. The longitudinal length of the drive shaft is registered orthogonal to the vertical passageway. Such a drive shaft includes a helical blade that is monolithically formed therewith in such a manner that the helical blade travels along a major longitudinal length of the drive shaft and converges inwardly towards a distal end of the drive shaft. The helical blade is partially seated within the bottom support member and transitions the tomatoes from the vertical passageway to the horizontal passageway. A radius of the helical blade effectively decreases from a proximal end of the drive shaft towards a distal end of the drive shaft. The blade preferably laterally and horizontally extends from a proximal end of the hollow cavity to a distal end of the hollow chamber.

A universal coupling is mounted directly to an exterior of the bottom support member and is concentrically housed about a proximal end of the drive shaft. Such a universal coupling is permanently attached to the bottom support member. The proximal end of the drive shaft and the coupling are removably attached directly to a peripheral commercial mixer.

A hollow chamber is directly coupled to the bottom support member. Such a hollow chamber houses a major longitudinal length of the blade and the drive shaft respectively. The hollow chamber has a distal end for effectively and conveniently discharging the tomatoes out from the hollow chamber. Such a hollow chamber may be provided with a pair of apertures formed at proximal and distal ends thereof for effectively receiving and discharging the tomato byproduct respectively.

The assembly preferably further includes a mesh screen that is rotatably seated within the hollow chamber. Such a mesh screen has open proximal and distal ends positioned through the pair of apertures respectively such that the mesh screen is in fluid communication with the cavity and extends along an entire horizontal length of the second passageway. The mesh screen may have an outer surface that converges distally towards the distal end of the hollow chamber and thereby effectively compacts the tomato byproduct prior to exiting through the distal end of the mesh screen.

The assembly preferably further includes an outwardly flaring discharge spout that is directly attached to the distal end of the hollow chamber in such a manner that the discharge spout is in fluid communication with the second passageway for advantageously allowing a user to effectively deposit the spout into a collection bin for conveniently receiving the tomato byproduct. The discharge spout preferably remains statically coupled directly to the hollow chamber while the mesh screen and the blade rotate about the drive shaft.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

Figure 1:
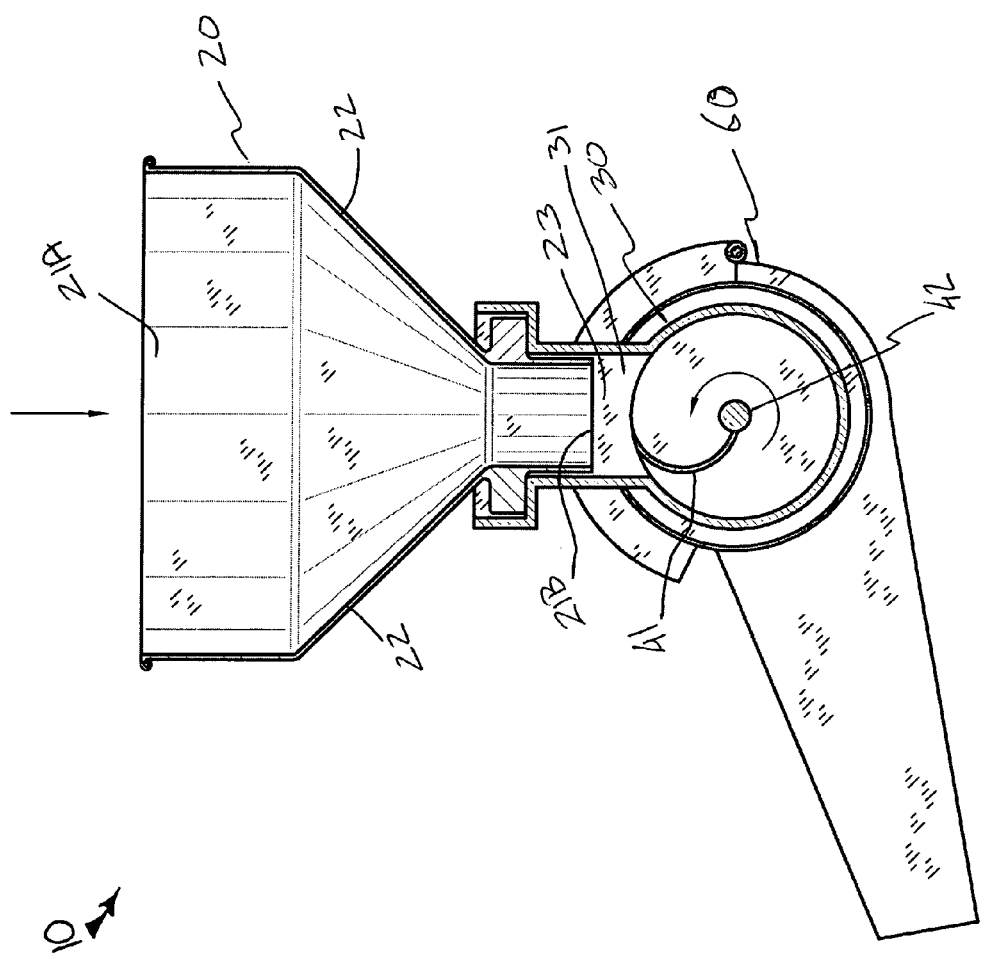
FIG. 1 is a front-elevational view showing a commercial tomato strainer attachment, in accordance with the present invention.
Figure 2:
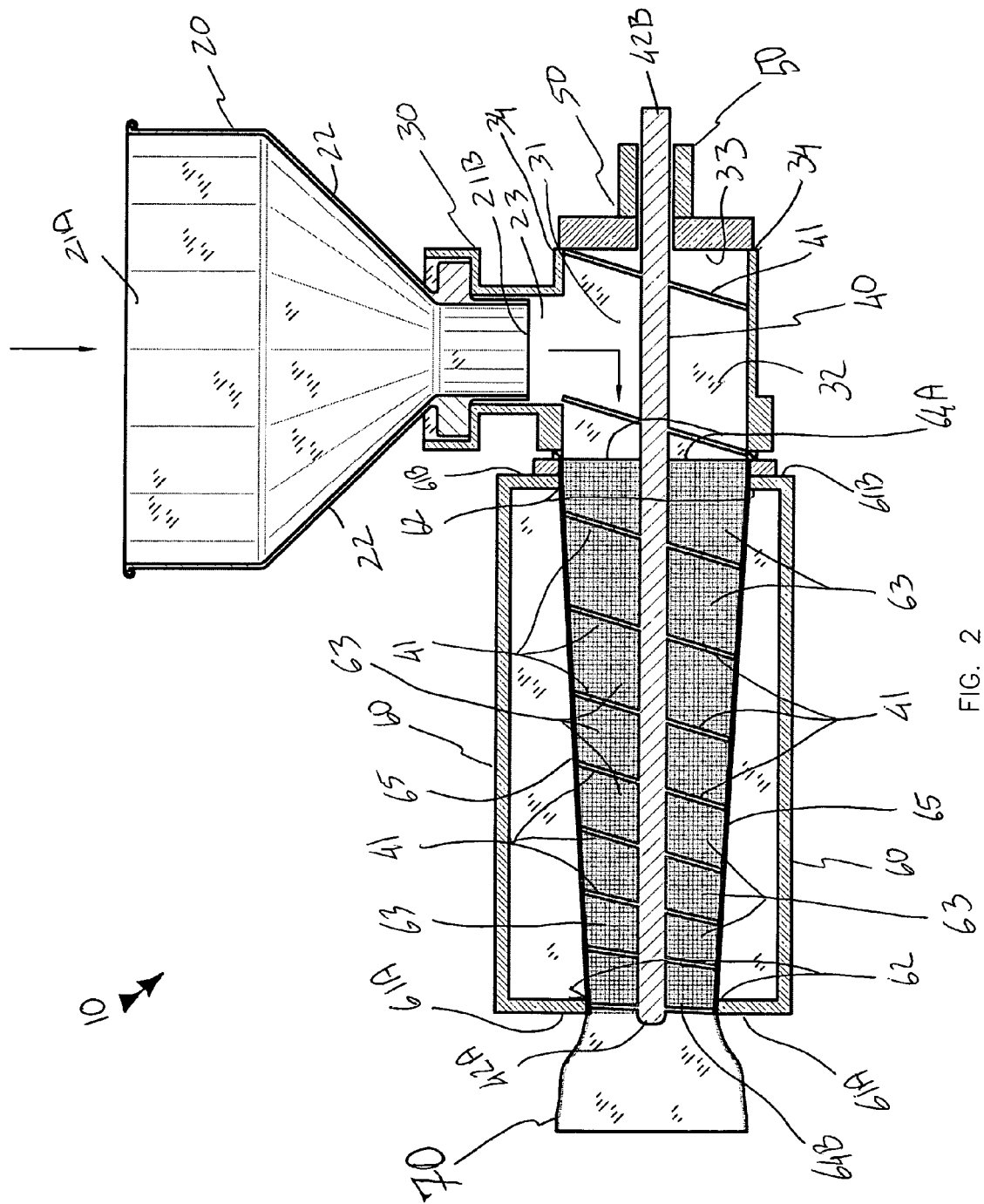
FIG. 2 is a cross-sectional view of the assembly shown in FIG. 1.
Figure 3:
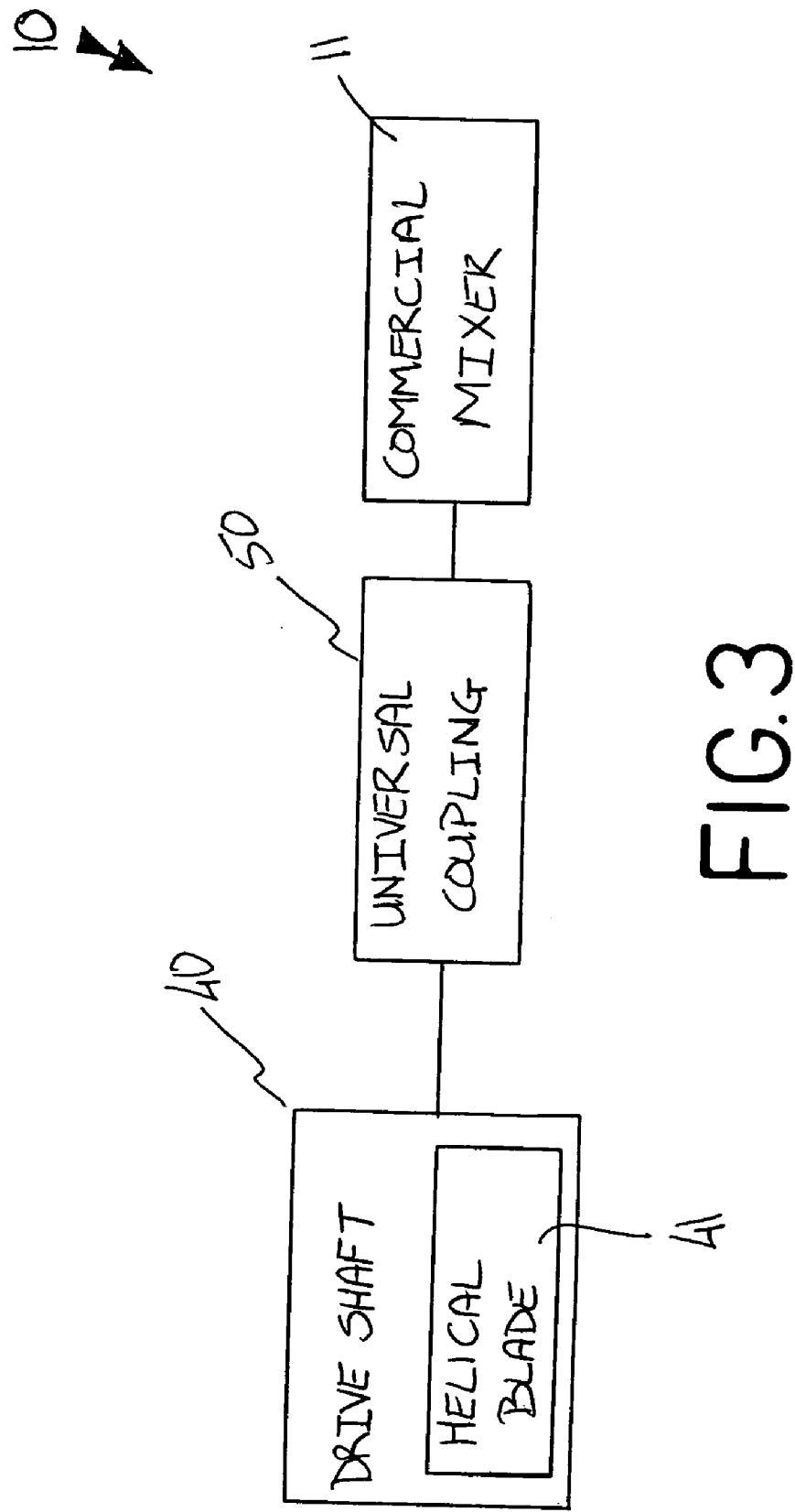
FIG. 3 is a schematic block diagram of the assembly shown in FIGS. 1 and 2.

The assembly of this invention is referred to generally in FIGS. 1-3 by the reference numeral 10 and is intended to provide a commercial tomato strainer attachment. It should be understood that the assembly 10 may be used to strain and extract pulp from many different types of fruits and vegetables and should not be limited in use to only tomatoes.

Referring initially to FIGS. 1 and 2, the assembly 10 includes a hopper 20 that has an open top end 21A provided with a downwardly converging outer wall 22 terminating at an open bottom end 21B. Such an open bottom end 21B has a cylindrical shape and is provided with a diameter smaller than a diameter of the open top end 21A, which is essential such that the tomatoes deposited into the hopper 20 are effectively and conveniently caused to exit out of a vertical passageway 23 centrally registered with the open bottom end 21B. The converging shape of the hopper 20 is critical for directing a concentrated quantity of tomatoes downwardly through the open bottom end 21B so that the tomatoes do not undesirably separate and become lodged at the open bottom end 21B.

Again referring to FIGS. 1 and 2, a bottom support member 30 is directly coupled, without the use of intervening elements, to the open bottom end 21B of the hopper 20. Such a bottom support member 30 further has a cavity 31 vertically aligned beneath the open bottom end 21B. The cavity 31 is vital for effectively directing the tomatoes along a horizontal passageway 32 leading away from the vertical passageway 23, as is best shown in FIG. 2.

Referring to FIGS. 1, 2 and 3, an elongated drive shaft 40 has a longitudinal length extending through the cavity 31. The longitudinal length of the drive shaft 40 is registered orthogonal to the vertical passageway 23. Such a drive shaft 40 includes a helical blade 41 that is monolithically formed therewith in such a manner that the helical blade 41 travels along a major longitudinal length of the drive shaft 40 and converges inwardly towards a distal end 42A of the drive shaft 40. The helical blade 41 is partially seated within the bottom support member 30 and transitions the tomatoes from the vertical passageway 23 to the horizontal passageway 32. A radius of the helical blade 41 effectively decreases from a proximal end 42B of the drive shaft 40 towards a distal end 42A of the drive shaft 40. The blade 41 laterally and horizontally extends from a proximal end 33 of the hollow cavity 31 to a distal end 61A of the hollow chamber 60 (described herein below).

Referring to FIGS. 2 and 3, a universal coupling 50 is mounted directly, without the use of intervening elements, to an exterior 34 of the bottom support member 30 and is concentrically housed about a proximal end 42B of the drive shaft 40. Such a universal coupling 50 is permanently attached to the bottom support member 30. The proximal end 42B of the drive shaft 40 and the coupling 50 are removably attached directly, without the use of intervening elements, to a peripheral commercial mixer 11. The universal coupling 50 may be used to attach the assembly to various commercial mixers 11 as is obvious to a person of ordinary skill in the art Referring to FIGS. 1 and 2, a hollow chamber 60 is directly coupled, without the use of intervening elements, to the bottom support member 30. Such a hollow chamber 60 houses a major longitudinal length of the blade 41 and the drive shaft 40 respectively. The hollow chamber 60 has a distal end 61A that is crucial for effectively and conveniently discharging the tomatoes out from the hollow chamber 60. Such a hollow chamber 60 is provided with a pair of apertures 62 formed at proximal 61B and distal 61A ends thereof for effectively receiving and discharging the tomato byproduct respectively.

Referring to FIG. 2, the assembly 10 further includes a mesh screen 63 that is rotatably seated within the hollow chamber 60. Such a mesh screen 63 has open proximal 64A and distal 64B ends positioned through the pair of apertures 62 respectively such that the mesh screen 63 is in fluid communication with the cavity 31 and extends along an entire horizontal length of the second passageway 32. The mesh screen 63 has an outer surface 65 that converges distally towards the distal end 61A of the hollow chamber 60, which is an essential and advantageous feature for effectively compacting the tomato byproduct prior to exiting through the distal end 64B of the mesh screen 63.

Still referring to FIG. 2, the assembly 10 also includes an outwardly flaring discharge spout 70 that is directly attached, without the use of intervening elements, to the distal end 61A of the hollow chamber 60 in such a manner that the discharge spout 70 is in fluid communication with the second passageway 32, which is important and advantageous for allowing a user to effectively deposit the spout 70 into a collection bin (not shown) for conveniently receiving the tomato byproduct. The discharge spout 70 remains statically coupled directly, without the use of intervening elements, to the hollow chamber 60 while the mesh screen 63 and the blade rotate 41 about the drive shaft 40.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A commercial tomato strainer attachment removably connectable to a commercial mixer for pureeing food products, said commercial tomato strainer attachment comprising:
    a hopper having an open top end provided with a downwardly converging outer wall terminating at an open bottom end, said open bottom end having a cylindrical shape and being provided with a diameter smaller than a diameter of said open top end such that the tomato deposited into said hopper are caused to exit out a vertical passageway centrally registered with said open bottom end;
    a bottom support member directly coupled to said open bottom end of said hopper, said bottom support member further having a cavity vertically aligned beneath said open bottom end, said cavity directing the tomato along a horizontal passageway leading away from said vertical passageway;
    an elongated drive shaft having a longitudinal length extending through said cavity, said longitudinal length of said drive shaft being registered orthogonal to said vertical passageway, said drive shaft including a helical blade monolithically formed therewith in such a manner that said helical blade travels along a major longitudinal length of said drive shaft and converges inwardly towards a distal end of said drive shaft, said helical blade being partially seated within said bottom support member and transitioning the tomato from said vertical passageway to said horizontal passageway;
    a universal coupling mounted directly to an exterior of said bottom support member and concentrically housed about a proximal end of said drive shaft, said proximal end of said drive shaft and said coupling are removably attached directly to a peripheral commercial mixer; and
    a hollow chamber directly coupled to said bottom support member, said hollow chamber housing a major longitudinal length of said blade and said drive shaft respectively, said hollow chamber having a distal end for discharging the tomatoes out from said hollow chamber.

2. The assembly of claim 1, wherein said hollow chamber is provided with a pair of apertures formed at proximal and distal ends thereof for receiving and discharging the tomato byproduct respectively.

3. The assembly of claim 2, further comprising:
    a mesh screen rotatably seated within said hollow chamber, said mesh screen having open proximal and distal ends positioned through said pair of apertures respectively such that said mesh screen is in fluid communication with said cavity and extends along an entire horizontal length of said second passageway.

4. The assembly of claim 3, wherein said mesh screen has an outer surface converging distally towards said distal end of said hollow chamber and thereby compacts the tomato byproduct prior to exiting through said distal end of said mesh screen.

5. The assembly of claim 1, further comprising:
    an outwardly flaring discharge spout directly attached to said distal end of said hollow chamber in such a manner that said discharge spout is in fluid communication with said second passageway for allowing a user to deposit said spout into a collection bin for receiving the tomato byproduct.

6. The assembly of claim 1, wherein said blade laterally and horizontally extends from a proximal end of said hollow cavity to a distal end of said hollow chamber, wherein said discharge spout remains statically coupled directly to said hollow chamber while said mesh screen and said blade rotate about said drive shaft.

7. A commercial tomato strainer attachment removably connectable to a commercial mixer for pureeing food products, said commercial tomato strainer attachment comprising:
    a hopper having an open top end provided with a downwardly converging outer wall terminating at an open bottom end, said open bottom end having a cylindrical shape and being provided with a diameter smaller than a diameter of said open top end such that the tomato deposited into said hopper are caused to exit out a vertical passageway centrally registered with said open bottom end;
    a bottom support member directly coupled to said open bottom end of said hopper, said bottom support member further having a cavity vertically aligned beneath said open bottom end, said cavity directing the tomato along a horizontal passageway leading away from said vertical passageway;
    an elongated drive shaft having a longitudinal length extending through said cavity, said longitudinal length of said drive shaft being registered orthogonal to said vertical passageway, said drive shaft including a helical blade monolithically formed therewith in such a manner that said helical blade travels along a major longitudinal length of said drive shaft and converges inwardly towards a distal end of said drive shaft, said helical blade being partially seated within said bottom support member and transitioning the tomato from said vertical passageway to said horizontal passageway, a radius of the helical blade decreases from a proximal end of the drive shaft towards a distal end of the drive shaft;
    a universal coupling mounted directly to an exterior of said bottom support member and concentrically housed about a proximal end of said drive shaft, said proximal end of said drive shaft and said coupling are removably attached directly to a peripheral commercial mixer; and
    a hollow chamber directly coupled to said bottom support member, said hollow chamber housing a major longitudinal length of said blade and said drive shaft respectively, said hollow chamber having a distal end for discharging the tomatoes out from said hollow chamber.

8. The assembly of claim 7, wherein said hollow chamber is provided with a pair of apertures formed at proximal and distal ends thereof for receiving and discharging the tomato byproduct respectively.

9. The assembly of claim 8, further comprising:
    a mesh screen rotatably seated within said hollow chamber, said mesh screen having open proximal and distal ends positioned through said pair of apertures respectively such that said mesh screen is in fluid communication with said cavity and extends along an entire horizontal length of said second passageway.

10. The assembly of claim 9, wherein said mesh screen has an outer surface converging distally towards said distal end of said hollow chamber and thereby compacts the tomato byproduct prior to exiting through said distal end of said mesh screen.

11. The assembly of claim 7, further comprising:
an outwardly flaring discharge spout directly attached to said distal end of said hollow chamber in such a manner that said discharge spout is in fluid communication with said second passageway for allowing a user to deposit said spout into a collection bin for receiving the tomato byproduct.

12. The assembly of claim 7, wherein said blade laterally and horizontally extends from a proximal end of said hollow cavity to a distal end of said hollow chamber, wherein said discharge spout remains statically coupled directly to said hollow chamber while said mesh screen and said blade rotate about said drive shaft.

13. A commercial tomato strainer attachment removably connectable to a commercial mixer for pureeing food products, said commercial tomato strainer attachment comprising:
a hopper having an open top end provided with a downwardly converging outer wall terminating at an open bottom end, said open bottom end having a cylindrical shape and being provided with a diameter smaller than a diameter of said open top end such that the tomato deposited into said hopper are caused to exit out a vertical passageway centrally registered with said open bottom end;
a bottom support member directly coupled to said open bottom end of said hopper, said bottom support member further having a cavity vertically aligned beneath said open bottom end, said cavity directing the tomato along a horizontal passageway leading away from said vertical passageway;
an elongated drive shaft having a longitudinal length extending through said cavity, said longitudinal length of said drive shaft being registered orthogonal to said vertical passageway, said drive shaft including a helical blade monolithically formed therewith in such a manner that said helical blade travels along a major longitudinal length of said drive shaft and converges inwardly towards a distal end of said drive shaft, said helical blade being partially seated within said bottom support member and transitioning the tomato from said vertical passageway to said horizontal passageway, wherein a major length of said blade is disposed within said hollow chamber;
a universal coupling mounted directly to an exterior of said bottom support member and concentrically housed about a proximal end of said drive shaft, wherein said universal coupling is permanently attached to said bottom support member, said proximal end of said drive shaft and said coupling are removably attached directly to a peripheral commercial mixer; and
a hollow chamber directly coupled to said bottom support member, said hollow chamber housing a major longitudinal length of said blade and said drive shaft respectively, said hollow chamber having a distal end for discharging the tomatoes out from said hollow chamber.

14. The assembly of claim 13, wherein said hollow chamber is provided with a pair of apertures formed at proximal and distal ends thereof for receiving and discharging the tomato byproduct respectively.

15. The assembly of claim 14, further comprising:
a mesh screen rotatably seated within said hollow chamber, said mesh screen having open proximal and distal ends positioned through said pair of apertures respectively such that said mesh screen is in fluid communication with said cavity and extends along an entire horizontal length of said second passageway.

16. The assembly of claim 15, wherein said mesh screen has an outer surface converging distally towards said distal end of said hollow chamber and thereby compacts the tomato byproduct prior to exiting through said distal end of said mesh screen.

17. The assembly of claim 13, further comprising:
an outwardly flaring discharge spout directly attached to said distal end of said hollow chamber in such a manner that said discharge spout is in fluid communication with said second passageway for allowing a user to deposit said spout into a collection bin for receiving the tomato byproduct.

18. The assembly of claim 13, wherein said blade laterally and horizontally extends from a proximal end of said hollow cavity to a distal end of said hollow chamber, wherein said discharge spout remains statically coupled directly to said hollow chamber while said mesh screen and said blade rotate about said drive shaft.

\* \* \* \* \*